(12) United States Patent
McCormack et al.

(10) Patent No.: US 12,478,291 B2
(45) Date of Patent: Nov. 25, 2025

(54) HEMATOCRIT LEVEL DETECTION USING IR LASER REFRACTION

(71) Applicant: Instrumentation Laboratory Company, Bedford, MA (US)

(72) Inventors: Paul McCormack, Carlisle, MA (US); Stephanie Tangard, Groton, MA (US); Alberto Gomez Martinez de Lecea, Chelmsford, MA (US); Dan Lin, Princeton, NJ (US)

(73) Assignee: Instrumentation Laboratory Company, Bedford, MA (US)

( * ) Notice: Subject to any disclaimer, the term of this patent is extended or adjusted under 35 U.S.C. 154(b) by 885 days.

(21) Appl. No.: 16/774,903

(22) Filed: Jan. 28, 2020

(65) Prior Publication Data

US 2020/0237273 A1 Jul. 30, 2020

Related U.S. Application Data

(60) Provisional application No. 62/798,212, filed on Jan. 29, 2019.

(51) Int. Cl.
*G01N 33/48* (2006.01)
*A61B 5/145* (2006.01)
(Continued)

(52) U.S. Cl.
CPC ....... *A61B 5/14535* (2013.01); *A61M 1/3609* (2014.02); *G01F 23/2921* (2013.01); *G01N 33/48* (2013.01)

(58) Field of Classification Search
CPC .............. A61B 5/14535; A61M 1/3609; G01F 23/2921; G01F 23/292; G01N 33/48; G01N 33/491; G01N 2015/045
See application file for complete search history.

(56) References Cited

U.S. PATENT DOCUMENTS 4,055,768 A 10/1977 Bromberg
4,303,336 A 12/1981 Cullis
(Continued)

FOREIGN PATENT DOCUMENTS

CN 202092944 U 12/2011
EP 1181098 B1 7/2006
(Continued)

OTHER PUBLICATIONS

International Search Report and Written Opinion issued in corresponding PCT application no. PCT/US2020/015413, dated May 29, 2020 (No. of pp. 16).
(Continued)

*Primary Examiner* — Rebecca M Fritchman
(74) *Attorney, Agent, or Firm* — ArentFox Schiff LLP

(57) ABSTRACT

Principals of refraction of a light ray are used to identify the location of an interface between two materials having different refractive indices. The interface may be an interface between a plasma layer and a red blood cell layer of a centrifuged container, for example. An array of light detector elements are arranged to receive light that has been refracted through different layers in a centrifuged sample. Elements of the light detector array are arranged at known locations relative to an emitter of the light so detection of light by one or more particular detector elements is indicative of the angle of refraction of the light. Vertical position of the sample is tracked and correlated with corresponding angles of refraction to determine the vertical position of the sample when a change in the angle of diffraction is detected.

20 Claims, 4 Drawing Sheets

(51) Int. Cl.
*A61M 1/36* (2006.01)
*G01F 23/292* (2006.01)

(56) References Cited

U.S. PATENT DOCUMENTS

| | | | |
|---|---|---|---|
| 4,704,029 A | 11/1987 | Van Heuvelen | |
| 5,370,114 A | 12/1994 | Wong et al. | |
| 6,070,093 A | 5/2000 | Oosta et al. | |
| 6,403,037 B1 | 6/2002 | Chang et al. | |
| 6,770,883 B2 | 8/2004 | McNeal et al. | |
| 6,881,541 B2 | 4/2005 | Petersen et al. | |
| 6,887,432 B2 | 5/2005 | Kansy et al. | |
| 7,105,093 B2 | 9/2006 | de Gheldere et al. | |
| 7,138,091 B2 | 11/2006 | Lee et al. | |
| 8,211,386 B2 | 7/2012 | Talmer et al. | |
| 8,313,713 B2 | 11/2012 | Jacobs et al. | |
| 8,323,585 B2 | 12/2012 | Heavner | |
| 8,448,800 B2 | 5/2013 | Konrad | |
| 8,518,347 B2 | 8/2013 | Tajima | |
| 8,591,836 B2 | 11/2013 | Boege et al. | |
| 8,605,279 B2 | 12/2013 | Gotschy et al. | |
| 8,714,800 B2 | 5/2014 | Kobayashi et al. | |
| 8,808,649 B2 | 8/2014 | Ingber et al. | |
| 8,840,837 B2 | 9/2014 | Smith et al. | |
| 8,867,027 B2 * | 10/2014 | Kudavelly | G01N 33/49 356/40 |
| 9,005,543 B2 | 4/2015 | Grenz et al. | |
| 9,017,536 B2 | 4/2015 | Oishi et al. | |
| 9,360,422 B2 | 6/2016 | Koerperick et al. | |
| 9,463,458 B2 | 10/2016 | Valla | |
| 9,464,981 B2 | 10/2016 | Gibbons et al. | |
| 9,534,885 B2 | 1/2017 | Klinec et al. | |
| 9,540,675 B2 | 1/2017 | De Forest et al. | |
| 9,707,528 B2 | 7/2017 | Suchocki et al. | |
| 9,739,704 B2 | 8/2017 | Voit et al. | |
| 10,092,697 B2 | 10/2018 | Nessel et al. | |
| 10,137,447 B1 | 11/2018 | Motadel et al. | |
| 10,220,383 B2 | 3/2019 | Laukkonen | |
| 10,300,482 B2 | 5/2019 | Cooney et al. | |
| 10,371,604 B2 | 8/2019 | Rath et al. | |
| 10,376,878 B2 | 8/2019 | Calanca et al. | |
| 10,391,497 B1 | 8/2019 | Gong et al. | |
| 11,262,371 B2 | 3/2022 | Fukaya et al. | |
| 2005/0042145 A1 | 2/2005 | Ueda et al. | |
| 2007/0140919 A1 | 6/2007 | Clarkson et al. | |
| 2008/0026476 A1 | 1/2008 | Howell et al. | |
| 2008/0260585 A1 | 10/2008 | Murakami | |
| 2011/0107855 A1 | 5/2011 | Motadel | |
| 2011/0308335 A1 | 12/2011 | Pink et al. | |
| 2014/0233042 A1 | 8/2014 | Klinec et al. | |
| 2015/0231630 A1 | 8/2015 | Chow et al. | |
| 2016/0018427 A1 * | 1/2016 | Streibl | G01F 23/2921 702/19 |
| 2017/0030827 A1 | 2/2017 | Nickel et al. | |
| 2018/0169648 A1 | 6/2018 | Trau et al. | |
| 2018/0353957 A1 | 12/2018 | Bishop et al. | |
| 2019/0002956 A1 | 1/2019 | Stumbo et al. | |
| 2020/0324282 A1 | 10/2020 | Postier et al. | |

FOREIGN PATENT DOCUMENTS

| | | |
|---|---|---|
| EP | 2450690 A1 | 5/2012 |
| EP | 2492015 A1 | 8/2012 |
| EP | 2514528 A1 | 10/2012 |
| EP | 2968059 B1 | 2/2018 |
| EP | 3548181 A1 | 10/2019 |
| EP | 3938287 A1 | 1/2022 |
| EP | 1702210 B1 | 8/2022 |
| JP | H0225714 A | 1/1990 |
| JP | H0798239 A | 4/1995 |
| JP | 4950947 B2 | 6/2012 |
| JP | 5086286 B2 | 11/2012 |
| WO | 2002040131 A1 | 5/2002 |
| WO | 2011135115 A1 | 11/2011 |
| WO | 2018102747 A1 | 6/2018 |
| WO | 2020186045 A1 | 9/2020 |
| WO | 2022031459 A1 | 2/2022 |

OTHER PUBLICATIONS

International Preliminary Report on Patentability dated Aug. 13, 2021, International Application No. PCT/US20/15413 (10 pgs.).

Dan Lin, "Method of Estimating Hematocrit after Centrifugation" Apr. 20, 2018—39 pages.

* cited by examiner

HEMATOCRIT LEVEL DETECTION USING IR LASER REFRACTION

CROSS REFERENCE TO RELATED APPLICATIONS

The present application claims the priority of U.S. Provisional Patent Application No. 62/798,212 entitled "Hematocrit Level Detection Using IR Laser Refraction" which was filed on Jan. 29, 2019 and which is incorporated herein by reference in its entirety.

FIELD OF TECHNOLOGY

The present disclosure relates to optical techniques for determining the heights of separated fluid levels in a container and more particularly to using refraction of a light beam to determine levels of plasma and red blood cells in a centrifuged blood sample.

BACKGROUND

The hematocrit level of a blood sample can be detected by centrifuging the blood sample in a container to separate the blood into at least a plasma layer and a red blood cell layer. The respective amounts of fluid in the plasma layer and the red blood cell layer can then be compared or measured to determine the hematocrit level of the blood sample.

FIG. 1 shows an example of a centrifuged sample of blood having normal hematocrit levels 102 compared to a centrifuged sample of blood having a depressed hematocrit level 104 and a centrifuged sample of blood having an elevated hematocrit level 106. In each sample, the vertical height of a boundary between a plasma layer 108 and a red blood cell layer 110 along with the height of the top of the plasma layer 108 can be used to determine the hematocrit level of the respective sample. Each sample may also include a buffy coat layer 112 of white blood cells and platelets between the plasma layer 108 and the red blood cell layer.

SUMMARY

Aspects of the present disclosure include a system, method and apparatus for determining hematocrit of a blood sample after centrifugation. The disclosed system method and apparatus uses principals of refraction of a light ray, according to Snell's Law, for example, to identify the location of an interface between two materials of different refractive indices. In an exemplary embodiment the interface may be an interface between a plasma layer and a red blood cell layer of a centrifuged container, for example. Snell's Law states that $N1 \sin \theta1 = N2 \sin \theta2$, wherein $N1$ is a refractive index of a first material on a first side of an optical interface and $N2$ is a refractive index of a second material on a second side of the optical interface; and wherein $\theta1$ is an angle of incidence of a light ray on the first material and $\theta2$ is an angle of refraction of the light ray in the second material.

According to an aspect of the present disclosure, an array of light detector elements are arranged to receive light that has been refracted through different layers in a centrifuged sample. Elements of the light detector array are arranged at known locations relative to an emitter of the light so detection of light by one or more particular detector elements is indicative of the angle of refraction of the light. Vertical position of the sample is tracked and correlated with corresponding angles of refraction to determine the vertical position of the sample when a change in the angle of diffraction is detected.

Previously known techniques for determine hematocrit of a blood sample after centrifugation have involved detecting difference in absorption of light passing through different layers of centrifuged samples. Embodiments of the presently disclosed system, method and apparatus can provide more rapid and accurate determinations of hematocrit of a blood sample after centrifugation by measuring differences in light refraction in different layers rather than relying on measurements of differences light absorption in the different layers.

BRIEF DESCRIPTION OF THE DRAWINGS

The foregoing and other features and advantages of the present invention will be more fully understood from the following detailed description of illustrative embodiments taken in conjunction with the accompanying drawings in which.

DETAILED DESCRIPTION

Aspects of the present disclosure include a method and apparatus for determining the location of one or more boundaries between separated fluids in a container using laser refraction techniques. In an illustrative embodiment, the disclosed method and apparatus can be used to determine the hematocrit of a blood sample after the centrifugation of the blood sample.

The disclosed method and apparatus monitors the refraction of a light beam projected through a sample in a container to identify the location of an interface between two materials of different refractive indices based on a change in the angle of refraction at that vertical location of the container. In the illustrative embodiment, the disclosed method and apparatus monitors the refraction of a light beam projected through a centrifuged blood sample and identifies a vertical position of the boundary between a plasma layer and a red blood cell layers as the position where the angle of refraction changes.

In contrast to the disclosed optical refraction based techniques, previously known techniques to determine the hematocrit of a blood sample after centrifugation have been based on monitoring the difference in absorption of light when light passes through plasma versus the absorption of light when it passes through red blood cells in a centrifuged sample.

Figure 1:
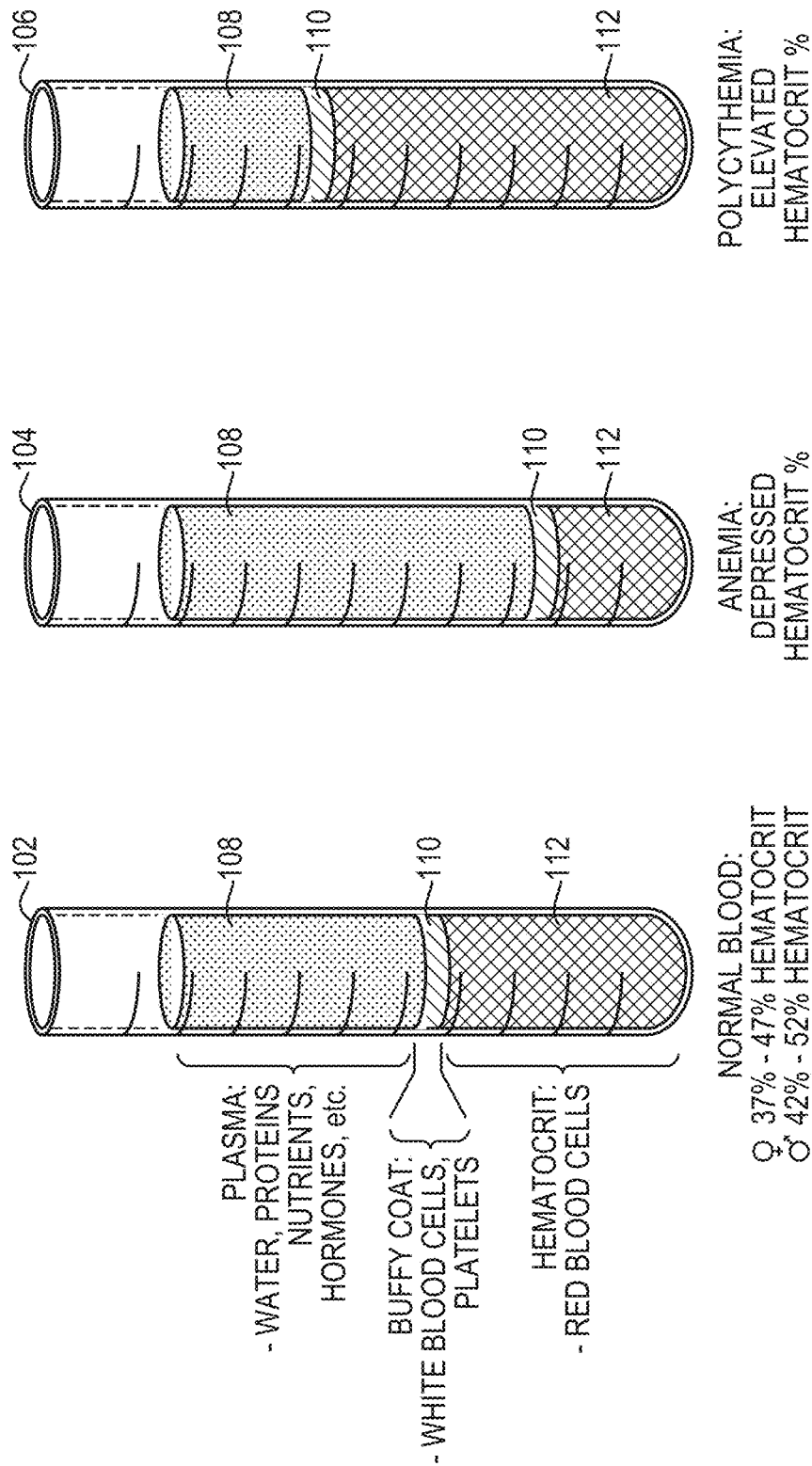
FIG. 1 is a background illustration showing an example of a centrifuged sample of blood having normal hematocrit levels compared to a centrifuged sample of blood having a depressed hematocrit level and a centrifuged sample of blood having an elevated hematocrit level.
Figure 2:
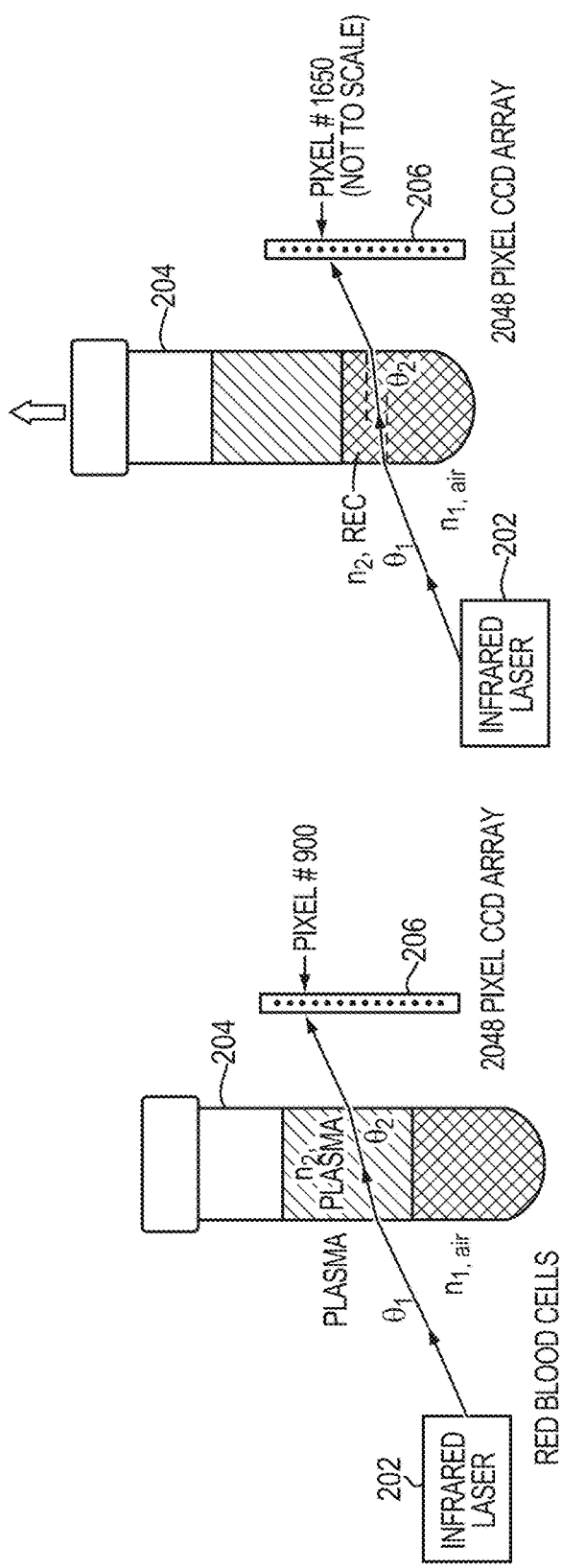
FIG. 2 is a schematic drawing of an infrared laser source being directed through a test tube at a linear array of detector elements juxtaposed with corresponding graphs showing an amount of light detected for each detector element according to an aspect of the present disclosure.
Figure 2:
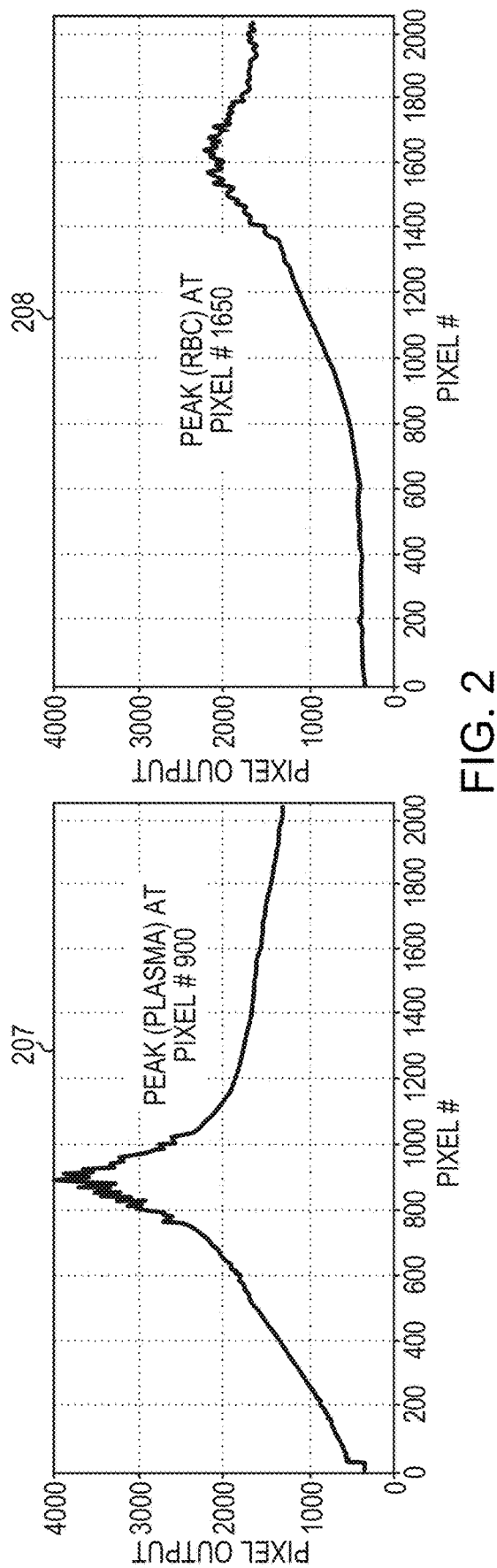

Referring to FIG. 2, according to an aspect of the present disclosure, an infrared laser source 202 is directed through a test tube 204 at a linear array 206 of detector elements. In an illustrative embodiment, the infrared laser source 202 emits an infrared beam having a wavelength of about 980 nm. The test tube 204 contains a centrifuged blood sample. In an illustrative embodiment, detector elements are charged coupled devices (CCDs).

Snell's Law states that $n1 \sin \theta 1 = n2 \sin \theta 2$ where n1 is the refractive index of material 1, n2 is the refractive index of material 2, θ1 is angle of incident of the light ray in material 1, and θ2 is angle of refraction of the light ray in material 2. For materials having different refractive indices such as plasma and red blood cells in a centrifuged blood sample, a light ray transmitted through the material will be refracted by a different amount. Based on Snell's Law, the position of a beam after refracting through plasma will be different from the position of the same incident beam after refracting through a red blood cell layer.

The amount of light detected for each detector element in the linear detector array 206 is shown on a first graph 207 and a second graph 208 in which the horizontal axis represents the vertical height of the corresponding detector element in the array.

The first graph 207 shows the response detected by each of the detector elements in the detector array 206 when the tube 204 is in a first vertical position in which the laser beam passes through a plasma layer of the centrifuged blood sample as shown above the first graph 207. In the first graph 207 the peak of detection of the laser beam when the laser beam passes through plasma is located at element a particular one of the detector elements, e.g. pixel #900 of a 2048 pixel linear detector array.

The second graph 208 shows the response detected by each of the detector elements in the detector array 206 when the tube 204 is raised to a second vertical position in which the laser beam passes through a red blood cells (RBC) layer of the centrifuged blood sample as shown above the second graph 208. In the second graph 208, the peak of detection of the laser beam when the laser beam passes through the red blood cell layer is located at a different one of the detector elements, e.g. pixel #1650 of the 2048 pixel linear detector array.

According to an aspect of the present disclosure, a system and method for determining the hematocrit of a blood sample identifies the location of the interface between plasma and RBC as the test tube is raised by monitoring the laser peak location on the detector array. The location of the interface between air and plasma at the top of the tube can be determined in the same way. Knowing the tube type i.e. dimensions, the system can estimate the hematocrit of the sample. According to an aspect of the present disclosure, the disclosed system and method can determine the hematocrit of a centrifuged blood sample even if one or more paper labels are applied on the test tube because an infrared laser beam from the infrared laser source can pass through the paper labels Although the example shown in FIG. 2 describes the test tube being raised so that the infrared laser beam passes through different levels of the tube, it should be understood that the disclosed system and method could alternatively be implemented by holding the tube at a stationary height while raising and/or lowering the infrared light source 202 and the linear detector array in unison.

In addition to determining the hematocrit of a blood sample, the disclosed system and method can be used to identify samples that have not yet been centrifuged, to identify overfilled or under-filled samples and/or to identify the location of the bottom in a false bottom tube, for example.

Figure 3:
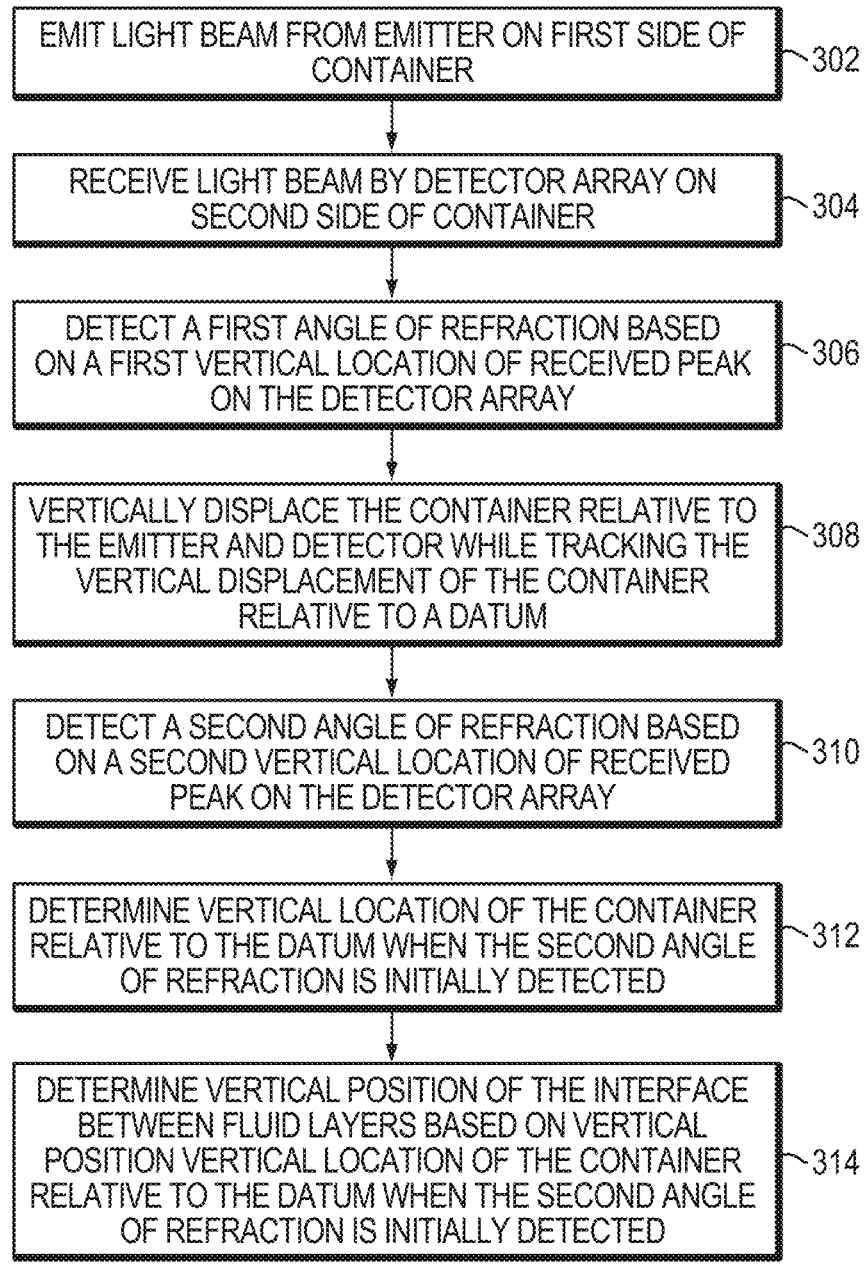
FIG. 3 is a process diagram showing a method for detecting a vertical position of an interface between fluid layers in a container according to an aspect of the present disclosure.

A method for detecting a vertical position of an interface between fluid layers in a container is described with reference to FIG. 3. In an illustrative embodiment the fluid in the container may be a centrifuged blood sample. In the illustrative embodiment, the interface between fluid layers includes an interface between a plasma layer and a red blood cell layer of the centrifuged blood sample. The interface between fluid layers may also include an interface between a plasma layer and a buffy layer and/or an interface between a buffy layer and a red blood cell layer. The interface between fluid layers may also include an interface between a layer of air and a top layer of liquid in the container, for example.

At step 302, the method includes emitting a light beam from a light emitter on a first side of the container. In an illustrative embodiment, the light beam is in the infrared wavelength region of the electromagnetic spectrum. The light emitter may be an infrared laser diode, for example. According to an aspect of the present disclosure, the light beam may pass through one or more labels on the container.

At step 304, the method includes receiving the light beam by a detector array disposed on a second side of the container opposite the light emitter. At step 306, the method includes detecting a first angle of refraction of the light beam based on a first vertical location of a received peak of the beam on the detector array relative to a vertical location of the light emitter.

At step 308, the method includes displacing the container vertically relative to the light emitter and detector array while tracking the vertical position of the container relative to a datum. At step 310, the method includes detecting a second angle of refraction of the light beam based on a second vertical location of the received peak of the beam on the detector array relative to the vertical location of the light emitter, wherein the second vertical location is different from the first vertical location. At step 312, the method includes determining the vertical position of the container relative to the datum when the second angle of refraction is initially detected. At step 314, the method incudes determining the vertical position of the interface between fluid layers in the container based on the vertical position of the container relative to the datum when the second angle of refraction is initially detected.

Figure 4:
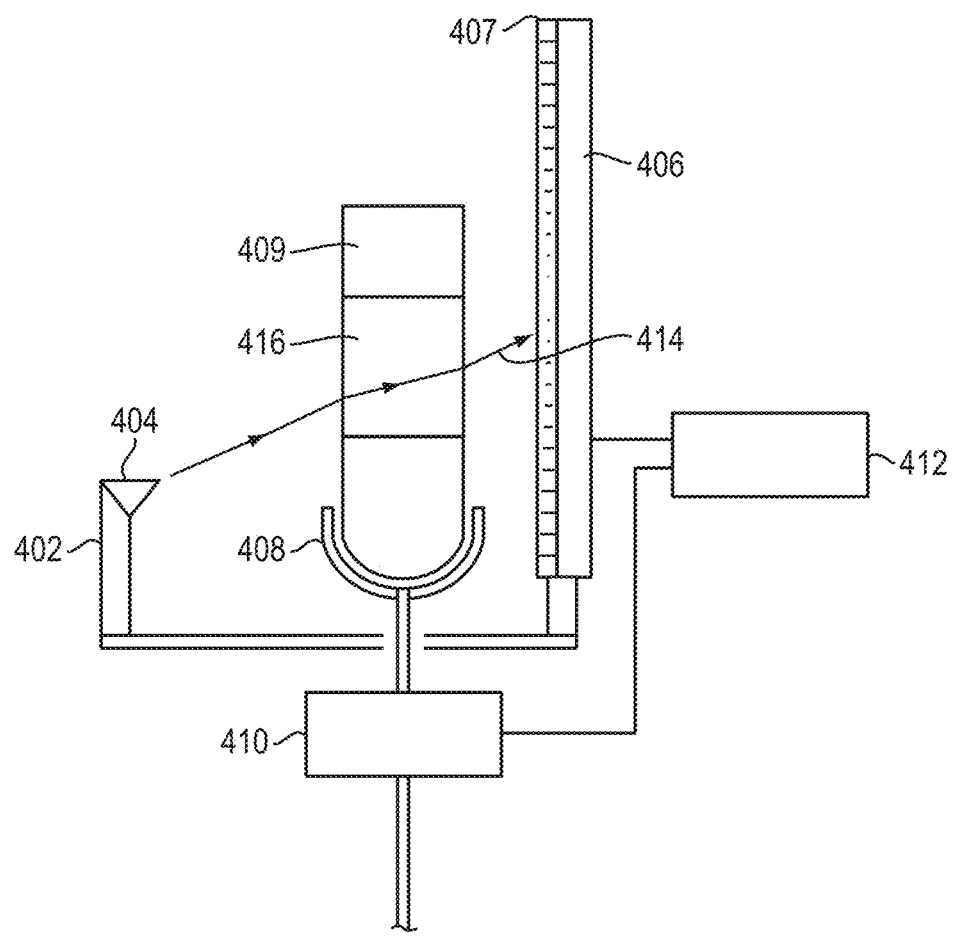
FIG. 4 is a schematic drawing of an apparatus for detecting a vertical position of an interface between fluid layers in a container according to an aspect of the present disclosure.

An apparatus 400 for detecting a vertical position of an interface between fluid layers in a container according to an aspect of the present disclosure is described with reference to FIG. 4. The apparatus 400 includes a sensing unit 402 having a light emitter 404 and a light detector array 406. The light detector array 406 includes a number of light detector elements 407 vertically displaced from each other. The light emitter 404 is positioned in a stationary location relative to the light detector array 406 and is directed toward the light detector array 406.

According to an aspect of the present disclosure, the apparatus 400 also includes a container positioning member 408 and a motion controller 410. The container positioning member 408 is configured for positioning a fluid container between the light detector array 406 and the light emitter 404. The motion controller 410 is configured for vertically displacing the container positioning member relative to the sensing unit 402.

The apparatus also includes processing circuitry 412 coupled to the light detector array 406 and the motion controller 410. According to an aspect of the present disclosure, the processing circuitry 412 is configured to track a vertical location of a light beam 414 received on the light detector array 406 from the light emitter 404. In an illustrative embodiment of the apparatus 400, the light beam 414 is in the infrared wavelength region of the electromagnetic spectrum. The light emitter 404 may be an infrared laser diode, for example.

The processing circuitry 412 tracks the vertical location of the light beam 414 on the light detector array 406 by identifying which of the light detector elements 407 receives a peak intensity of the received beam 414. According to an aspect of the present disclosure, the vertical location of the received beam 414 on the light detector array 406 is based on an angle of refraction of the received beam 414 traveling through a fluid sample 416 in the container 409.

According to an aspect of the present disclosure, the processing circuitry 412 is configured to determine a vertical position of the container 409 relative to a datum when the vertical location of the light beam 414 changes beyond a predetermined threshold. The change in vertical location of the light beam 414 is based on a change in the angle of refraction. The processing circuitry 412 is configured to determine a vertical position of the interface between fluid layers in the container 412 based on the vertical position of the container 412 relative to the datum when the vertical location of the light beam 414 changes beyond the predetermined threshold.

In an illustrative embodiment the fluid in the container may be a centrifuged blood sample. In the illustrative embodiment, the interface between fluid layers includes an interface between a plasma layer and a red blood cell layer of the centrifuged blood sample. The interface between fluid layers may also include an interface between a plasma layer and a buffy layer and/or an interface between a buffy layer and a red blood cell layer. The interface between fluid layers may also include an interface between a layer of air and a top layer of liquid in the container, for example.

Although the invention has been shown and described with respect to exemplary embodiments thereof, various other changes, omissions and additions in the form and detail thereof may be made therein without departing from the spirit and scope of the invention.

What is claimed is:

1. An apparatus for detecting a vertical position of an interface between fluid layers of a fluid sample in a container, the fluid layers comprising at least a first fluid and a second fluid, the apparatus comprising:
   a sensing unit comprising:
      a light detector array comprising light detector elements that are vertically arranged; and
      a light emitter in a stationary location relative to the light detector array and configured to direct a light beam at a predetermined wavelength toward the light detector array;
   a structure configured to hold the container containing the fluid sample between the light detector array and the light emitter while the container moves linearly between different vertical positions; and
   processing circuitry configured to perform operations comprising:
      tracking a vertical location of the light beam from the light emitter on the light detector array by identifying an amount of light detected by one or more of the light detector elements, where the light detected passed through the container while the container moves linearly, and where the vertical location of the light beam on the light detector array is based on an angle of refraction of the light beam traveling through a respective fluid layer and a scattering of the light beam across the one or more light detector elements, the scattering of the light beam being different for fluids having different compositions;
      determining a first vertical position of the container based on a first amount of light on one or more first light detector elements meeting a criterion, where the first amount of light is based on an angle of refraction of the first amount of light through the first fluid and a composition of the first fluid; and
      determining a second vertical position of the container based on a second amount of light on one or more second light detector elements meeting a criterion, where the second amount of light is based on an angle of refraction of the second amount of light through the second fluid and a composition of the second fluid; and
      determining the vertical position of the interface between the first fluid and the second fluid based on the first vertical position and the second vertical position.

2. The apparatus of claim 1, wherein the fluid sample comprises a centrifuged blood sample.

3. The apparatus of claim 2, wherein the first fluid comprises a plasma layer and the second fluid comprises a red blood cell layer.

4. The apparatus of claim 2, wherein the first fluid comprises a plasma layer and the second fluid comprises a buffy layer.

5. The apparatus of claim 2, wherein the first fluid comprises a buffy layer and the second fluid comprises a red blood cell layer.

6. The apparatus of claim 1, wherein the first fluid comprises air and the second fluid comprises liquid below the air.

7. The apparatus of claim 1, wherein the light beam from the light emitter is in an infrared wavelength region of the electromagnetic spectrum.

8. The apparatus of claim 2, wherein the light beam from the light emitter passes through one or more labels on the container.

9. The apparatus of claim 1, wherein the light emitter comprises an infrared laser diode.

10. A method of using the apparatus of claim 1 for determining the vertical position of the interface between the fluid layers in the container, the method comprising:
    the light emitter directing the light beam from a first side of the container;
    the light detector array receiving light from the light beam at a second side of the container opposite the first side;
    the processing circuitry determining the first vertical position based on the first amount of light on the one or more first light detector elements;
    displacing the container vertically relative to the light emitter and the light detector array while the light emitter continues to direct the light beam;
    the processing circuitry determining the second vertical position based on the second amount of light on the one or more second light detector elements; and
    the processing circuitry determining the vertical position of the interface based on the first vertical position and the second vertical.

11. The method of claim 10, wherein the fluid layers comprise a centrifuged blood sample.

12. The method of claim 11, wherein the first fluid comprises a plasma layer and the second fluid comprises a red blood cell layer.

13. The method of claim 11, wherein the first fluid comprises a plasma layer and the second fluid comprises a buffy layer.

14. The method of claim 11, wherein the first fluid comprises a buffy layer and the second fluid comprises a red blood cell layer.

15. The method of claim 10, wherein the first fluid comprises air and the second fluid comprises liquid.

16. The method of claim 10, wherein the first fluid comprises a layer of liquid and the second fluid comprises a layer of air below the layer of liquid, the container comprising a false bottom.

17. The method of claim 10, wherein the light beam from the light emitter is in an infrared wavelength region of the electromagnetic spectrum.

18. The method of claim 17, wherein the light beam from the light emitter passes through one or more labels on the container.

19. The method of claim 17, wherein the light beam from the light emitter passes through the container, the container having no labels.

20. The method of claim 17, wherein the light emitter comprises an infrared laser diode.

* * * * *